(12) United States Patent
Andrews et al.

(10) Patent No.: US 8,087,538 B2
(45) Date of Patent: Jan. 3, 2012

(54) APPARATUS, SYSTEM, AND METHOD FOR PROVIDING A SECURING MECHANISM FOR A VESSEL

(75) Inventors: Charles W. Andrews, Grapevine, TX (US); Thomas G. Morris, II, Hurst, TX (US); Jack R. Rigby, Richardson, TX (US)

(73) Assignee: Thermoserv Ltd., Dallas, TX (US)

( * ) Notice: Subject to any disclaimer, the term of this patent is extended or adjusted under 35 U.S.C. 154(b) by 232 days.

(21) Appl. No.: 12/554,442

(22) Filed: Sep. 4, 2009

(65) Prior Publication Data

US 2011/0056963 A1 Mar. 10, 2011

(51) Int. Cl.
- B65D 1/40 (2006.01)
- B65D 8/06 (2006.01)
- B65D 81/38 (2006.01)
- A47G 19/22 (2006.01)

(52) U.S. Cl. ............. 220/592.16; 220/23.87; 220/62.18

(58) Field of Classification Search ............. 220/592.16, 220/592.17, 62.12, 62.18, 23.87, 592.23, 220/592.27; 215/12.1, 12.2, 13.1
See application file for complete search history.

(56) References Cited

U.S. PATENT DOCUMENTS

| | | | | |
|---|---|---|---|---|
| 3,650,427 A | * | 3/1972 | Franklin | 215/12.1 |
| 6,921,179 B2 | * | 7/2005 | Diak Ghanem | 362/84 |
| 7,878,365 B1 | * | 2/2011 | Meehan | 220/737 |

* cited by examiner

Primary Examiner — Harry Grosso
(74) Attorney, Agent, or Firm — Patent Capital Group

(57) ABSTRACT

An apparatus in an example implementation includes a vessel that includes an inner wall and an outer wall. The outer wall includes a first set of grooves configured on an interior portion of a bottom of the outer wall. The inner wall includes a second set of grooves configured on an exterior of the inner wall. The first set of grooves are configured to interface with the second set of grooves to secure the inner wall and the outer wall together. In more specific embodiments, the first set of grooves and the second set of grooves are provided as ascending steps such that a rotational force applied to one of the walls operates to engage subsequent steps in each of the first and second sets of grooves. The walls are configured such that a rotational force creates a force being applied to the lip to secure the walls together.

19 Claims, 5 Drawing Sheets

FIG. 3B
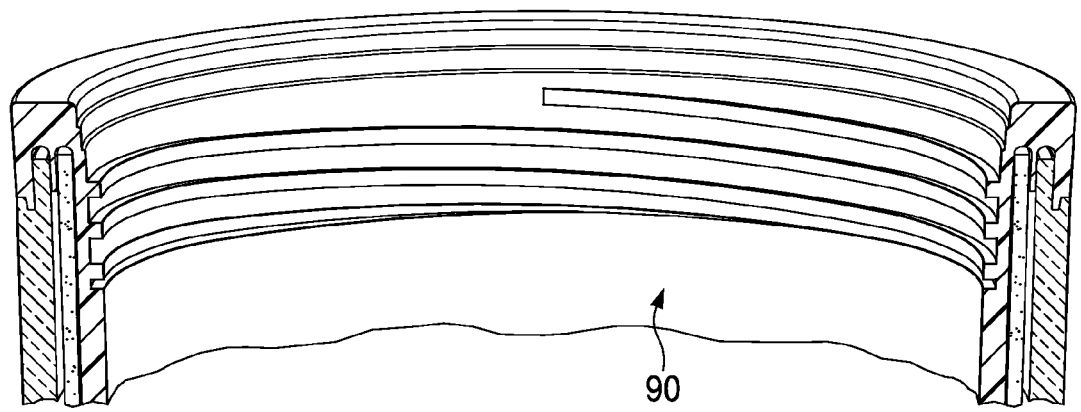
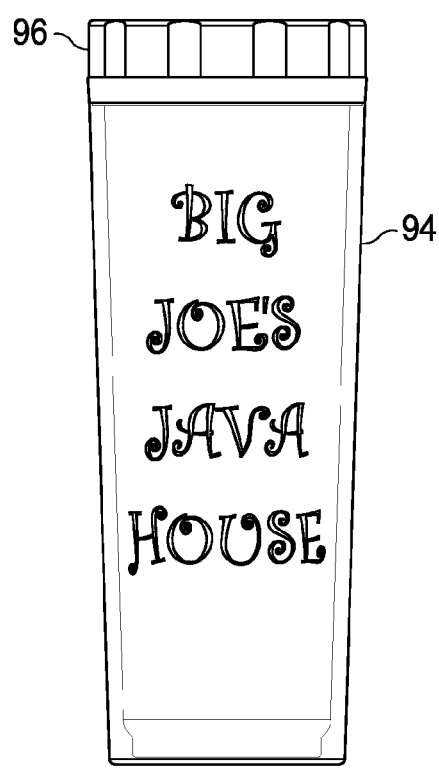
FIG. 3C

APPARATUS, SYSTEM, AND METHOD FOR PROVIDING A SECURING MECHANISM FOR A VESSEL

TECHNICAL FIELD

This disclosure relates in general to vessels and, more particularly, to an apparatus, a system and a method for providing a securing mechanism for a vessel.

BACKGROUND

Fluid vessels have grown increasingly popular in today's society. In both domestic and business environments, people are busy, active, and constantly on the go. Beverage containers are ubiquitous, as they can accompany people in their cars, or be a fixture in most workspaces. In contrast to antiquated ceramic mugs, drinking vessels today are typically made of some type of plastic that is lightweight, easily transportable, and resilient.

More sophisticated fluid vessels can offer insulation to provide a cool exterior surface for the vessel, while maintaining an internal temperature for the fluid residing therein. Current double-walled vessels are flawed, inefficient and, in the context of manufacturing, consume unnecessary resources, while leaving behind waste. Other defective vessel designs include imperfect connections between insulating walls, where the integrity of the connection is easily disturbed. Thus, providing a convenient, affordable, effective, and reliable vessel for transporting liquid presents a significant challenge for vessel manufacturers, retail managers, and component designers, alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-C are simplified schematic diagrams showing various implementations of the vessel in accordance with one example implementation of the present disclosure.

DETAILED DESCRIPTION OF EXAMPLE EMBODIMENTS

Overview

An apparatus in one example implementation includes a vessel that includes an inner wall and an outer wall. The outer wall includes a first set of grooves configured on an interior portion of a bottom of the outer wall. The inner wall includes a second set of grooves configured on an exterior of the inner wall. The first set of grooves are configured to interface with the second set of grooves to secure the inner wall and the outer wall together. In more specific embodiments, the first set of grooves and the second set of grooves are provided as ascending steps such that a rotational force applied to one of the walls operates to engage subsequent steps in each of the first and second sets of grooves. A lip configured on the inner wall, and the walls are configured such that a rotational force applied to one of the walls creates a force being applied to the lip to secure the inner wall and the outer wall together. The apparatus may further include a recess configured on the interior portion of the bottom of the outer wall, and a protrusion configured on the exterior of the inner wall, where the recess interfaces with the protrusion as the inner wall and the outer wall are secured together. The inner wall can comprise propylene and the outer wall can comprise styrene.

Example Embodiments

Figure 1A:
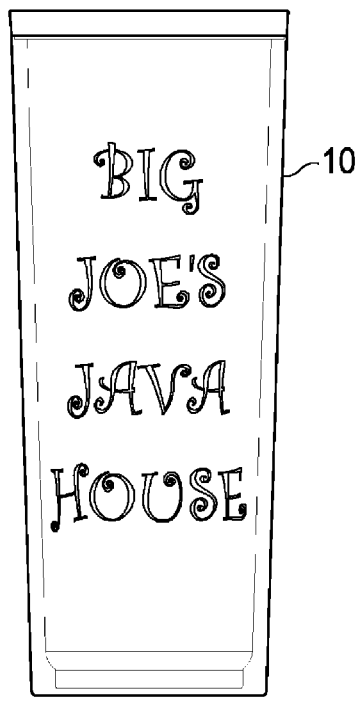
FIG. 1A is a simplified schematic diagram of a vessel in accordance with one example embodiment of the present disclosure.
Figure 1B:
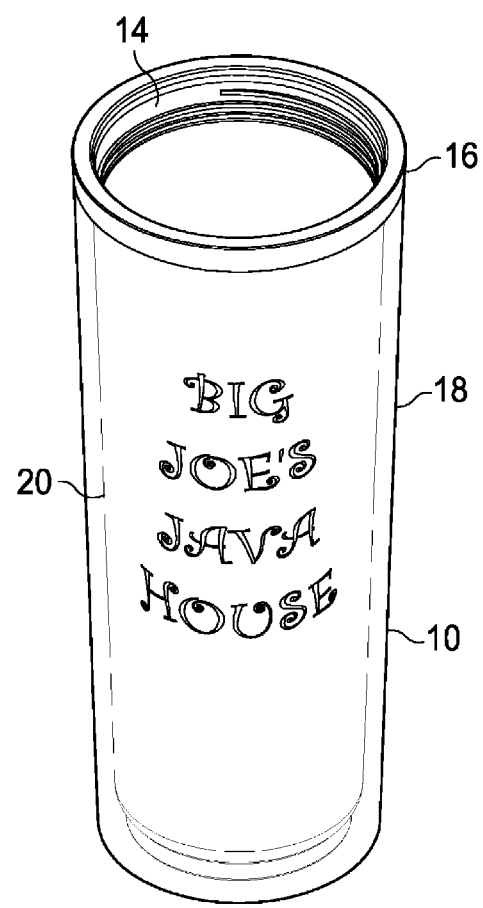
FIG. 1B is a simplified schematic diagram of the vessel in another embodiment.

FIG. 1A is a simplified schematic diagram of a vessel 10 in accordance with one example embodiment of the present disclosure. Vessel 10 can include a tight seal between an outer and an inner wall of vessel 10, where the walls have two dissimilar materials. In this particular example, vessel 10 is a double-walled insulated vessel having a number of salient properties described below. FIG. 1B is a simplified schematic diagram of vessel 10 in another embodiment. In this instance, vessel 10 includes a clear outer wall 18, which can be used for advertising, decoration, or other possible aesthetics or indicia that may be provided at this location. For example, some form of paper, decal, ink, or plastic having a particular design may be placed behind a translucent outer wall 18 to display some type of banner, billboard, or message.

Vessel 10 can also include an inner wall 20, a lip 16, and threads 14, which are configured to receive a top (i.e., lid, spout, etc.) that encloses this vessel 10. Thus, in one example, the top is secured to inner wall 20 of vessel 10. In one specific implementation, clear outer wall 18 is made of a material that is different from internal wall 20. For example, the materials used for clear outer wall 18 and inner wall 20 of vessel 10 may be different types of postconsumer (potentially recyclable) polymers. In yet another, more specific embodiment, inner wall 20 of vessel 10 is made of propylene, and clear outer wall 18 is made of styrene. Note that styrene is somewhat rigid, while propylene is typically more flexible, and the inherent properties of these materials engender their connection. In essence, these somewhat contrasting material properties provide an ideal bonding mechanism, as further detailed below.

For purposes of illustrating the techniques of vessel 10, it is important to understand the activities occurring within a given fluid container system. The following foundational information may be viewed as a basis from which the present disclosure may be properly explained. Such information is offered earnestly for purposes of explanation only and, accordingly, should not be construed in any way to limit the broad scope of the present disclosure and its potential applications. There are generally two forms of welding used in plastic material environments; each welding form uses some element of friction to maintain its connection. The first welding form is ultrasonic welding, which is a fast and cost-effective welding technique for small and medium size parts: somewhat ideal for vessel manufacturing. Cycle times can be short, where the process uses low amplitude, high frequency (ultrasonic) vibrational energy. One of the two parts to be joined is fixed firmly within a stationary holding jig, while the mating part is subjected to a sinusoidal ultrasonic vibration normal to the contact area. As a result of the friction between the parts and the internal friction in the parts, heat is generated. This causes the polymer to melt at the interface. When the vibration stops, the weld cools down and solidifies. Ultrasonic welding has the advantage that the melted polymer is not exposed to air, which can be important for materials that are susceptible to degradation or oxidation.

The second welding form is spin welding, which is a technique used on thermoplastic materials, in which the parts to be welded are heated by friction. The heat may be generated by turning on a lathe, a drill press, or a milling machine, where one part is driven by the chuck, and the other is held stationary with the spinning part driven against it. This is continued until the heat of friction between the parts reaches a sufficient level for the parts to weld. The stationary part is then released to spin as well, while pressure is applied along the axis of rotation, holding the parts together as they cool.

Note that both forms of welding depend on similar materials being bonded together. Stated otherwise, mechanical bonds are limited by material types and resin specificities. This inhibits and restricts some design choices in developing new products to be delivered to the market. Note also that there is a certain amount of complexity and labor involved in any welding process. From an economic standpoint, and as a general notion, there are wastes and costs associated with welding operations.

To solve these issues, as well as to address other inefficiencies, vessel 10 can be constructed of two different materials that can be intelligently coupled, as described below. In constructing vessel 10, inner wall 20 can be inserted into outer wall 18 and a ratcheting element in the bottom of vessel 10 can apply pressure to a joint at the top of vessel 10 (for example, at lip 16). A number of ascending grooves (i.e., steps) in the ratcheting mechanism can be engaged in order to methodically and systematically form (and strengthen) a connection between inner wall 20 and outer wall 18. As used herein in this Specification, the term 'groove' is meant to connote any type of teeth, spike, step, undulation, ripple, ratcheting mechanism, or surface irregularity that would provide some resistive force between two materials. Due to an intelligent material selection, the inner wall material flexes to provide a viable seal for vessel 10, which obviates the need for mechanical welding. In essence, inner wall 20 is actually forced into outer wall 18, where it is secured at multiple (e.g., two) ridges of lip 16, while simultaneously being snugged by a friction element at the bottom of vessel 10.

Ironically, in most washing scenarios for vessel 10 (e.g., a dishwasher), heat would only cause the bond to be stronger between the two walls, as the propylene (or any other suitable expansive material) would enlarge, swell, or otherwise increase in size. This increase in size would encounter a more rigid or pliable material (e.g., styrene), where the tension between these two forces only augments the seal. In essence, these forces oppose each other during thermal expansion and drive a stronger wedge between the two materials.

Note that in using two different types of materials, traditional welding processes may not be appropriate to forge the bonds of vessel 10. This is because most welding approaches involve the use of two similar materials being forged together. In contrast, the two materials of vessel 10 naturally cause the two materials to bind together more tightly (for example, at the top of vessel 10) in the presence of heat.

Figure 1C:
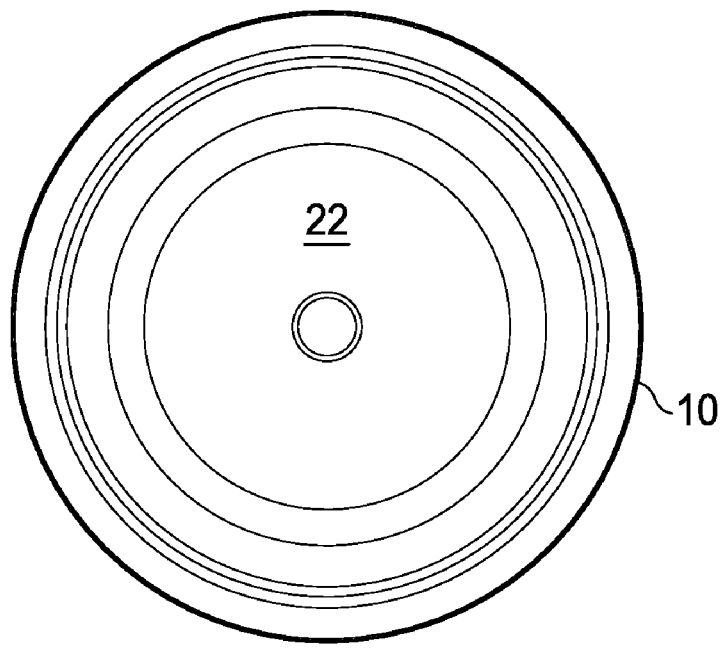
FIGS. 1C-D represent schematic views for the vessel in accordance with example embodiments of the present disclosure.
Figure 1D:
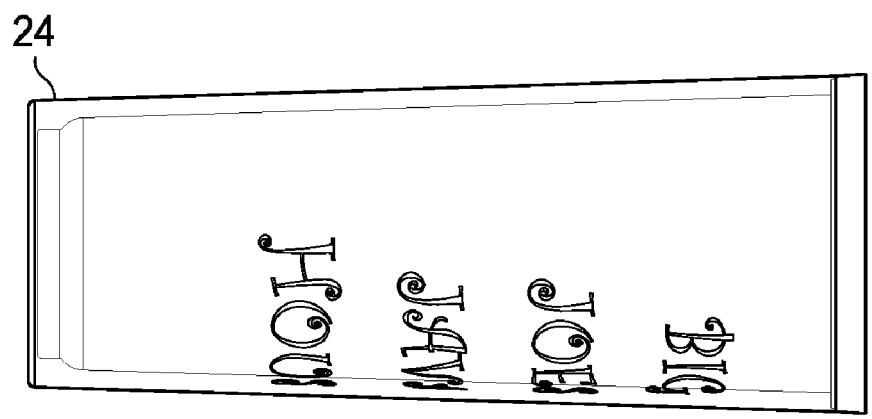

FIGS. 1C-D represent a top view and a side view respectively for vessel 10. A small raised portion 22 is represented in FIG. 1C and a bottom portion 24 is identified in FIG. 1D (from a lateral perspective). Both of these elements represent design choices, which could be varied considerably without the parting from the scope of the present disclosure.

Figure 2A:
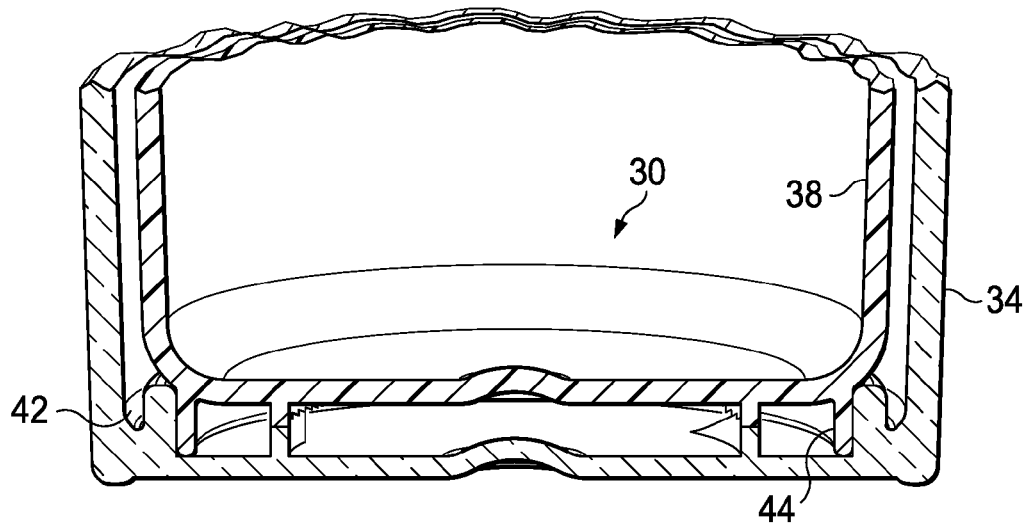
FIGS. 2A-C represent simplified schematic diagrams of a bottom of the vessel in accordance with one example implementation of the present disclosure.
Figure 2B:
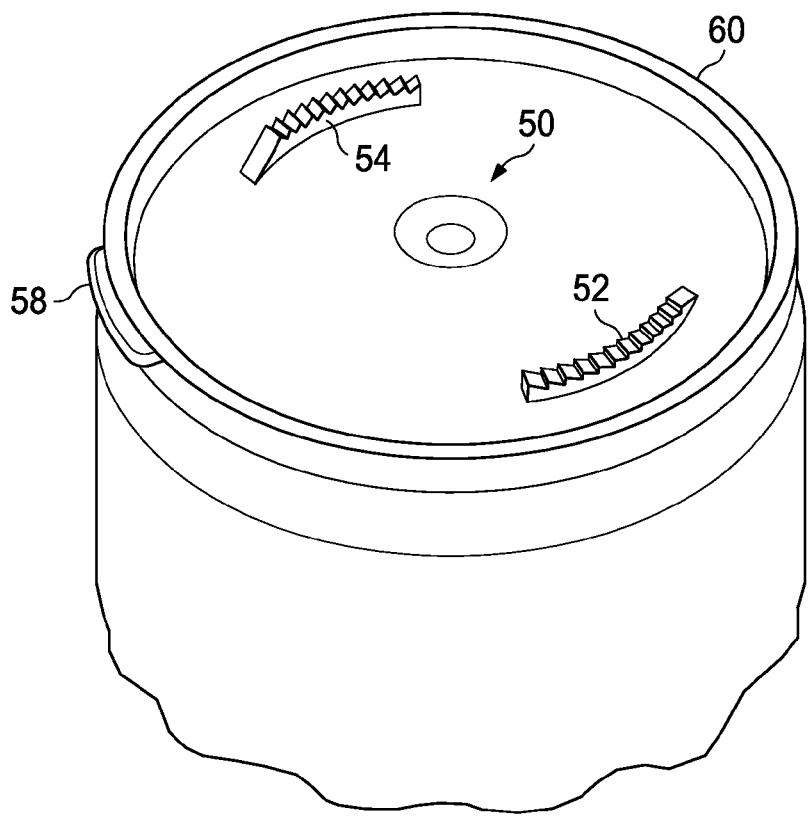
Figure 2C:
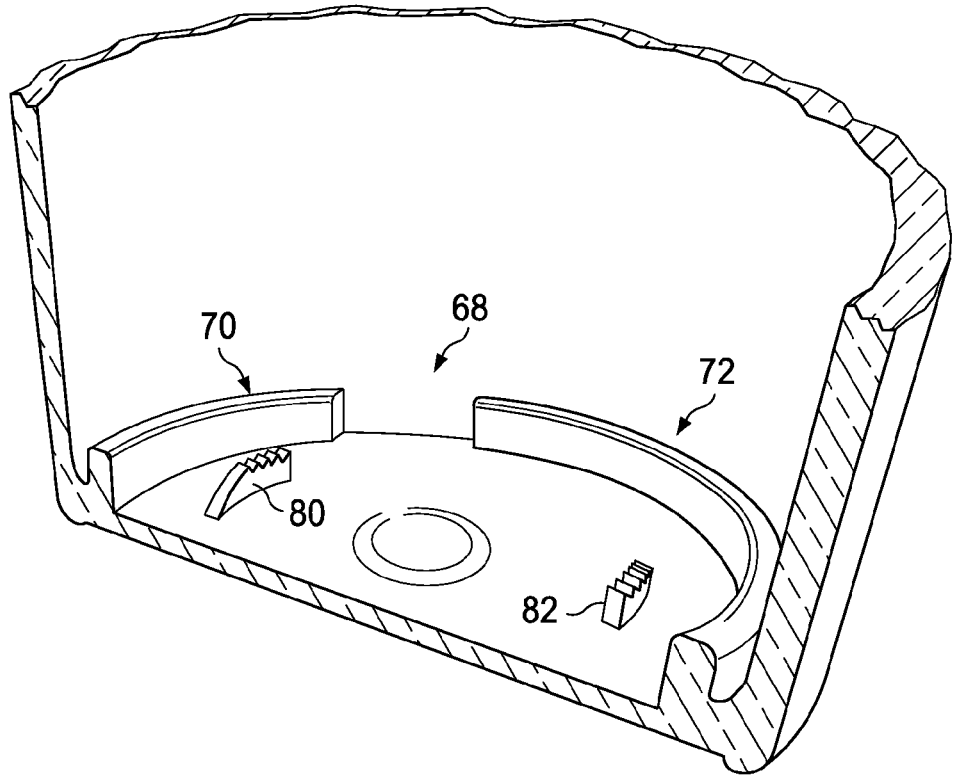

FIGS. 2A-C represent simplified schematic diagrams of a bottom 30 of vessel 10. FIG. 2A depicts an inner wall 38 and an outer wall 34. Inner wall 38 may include one or more fins 44 (of varying length), which can mate with one or more contacts or interfaces associated with the bottom of outer wall 34. Also provided in outer wall 34 is a vacant insulating cavity 42, which can extend up the length of vessel 10. The space in this void (e.g., between the inner and outer walls) may vary based on particular insulation needs. FIG. 2B includes a bottom 50, which further includes a set of grooves 52 and 54, along with a set of protrusions 58 and 60 that are provided along the perimeter of the bottom of inner wall 38. When the inner wall is registered to the outer wall, protrusions 58 and 60 slip into recesses in the outer wall to facilitate the connection.

FIG. 2C is a cross-sectional view of vessel 10, which illustrates a recess 68 associated with the securing mechanism. FIG. 2C further includes a set of grooves 80 and 82, along with a set of ridges 70 and 72 for securing the inner wall to the outer wall. Ridges 70 and 72 can interface with fins 44, as the two walls are mated together. Grooves 80 and 82 have a natural connection with grooves 52 and 54, when the outer wall and the inner wall come into contact. By turning either the outer wall or inner wall (e.g., in a clockwise or a counterclockwise fashion), the outer wall and the inner wall are fastened together. Note that this securing mechanism operates in a single direction, where the reverse direction would not mechanically undo this coupling.

In one example implementation, the securing mechanism operates in a corkscrew configuration, where the inner wall is inserted into the outer wall and turned in a clockwise direction in order to secure the two wall components together. Once the outer wall and the inner wall are secured together, and as protrusions 58 and 60 are received by appropriate recesses of the outer wall, grooves 80 and 82 interface with grooves 52 and 54 in order to prevent a decoupling between the outer wall and the inner wall. The ascending steps of the grooves are configured to systematically tighten the connection between the outer and inner walls. A rotational force applied to either wall would allow it to effectively engage and lock onto these steps and, thereby, provide a suitable connection between these walls.

Note that vessel 10 can include any number of possible materials to be used in constructing outer wall 18 and inner wall 20 and these may include (but are not limited to) any type of polymer, vinyl, rubber, styrene, propylene, polypropylene, polyurethane, polystyrene, styrene-butadiene (SBR) rubber, styrene-butadiene latex, styrene-isoprene-styrene (SIS), styrene-ethylene/butylene-styrene (S-EB-S), styrene-divinylbenzene (S-DVB), unsaturated polyester, elastomer, thermoplastic, glass ceramic, amorphous material, semi-crystalline material, etc. Additionally, it should be noted that although a ratcheting mechanism is employed by vessel 10 for coupling its walls, the secure connection between components may be aided by glue, o-ring structures for compressing materials together, etc. without departing from the broad teachings of the present disclosure.

It is imperative to note that all of the specifications and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, should be construed as such.

Figure 3A:
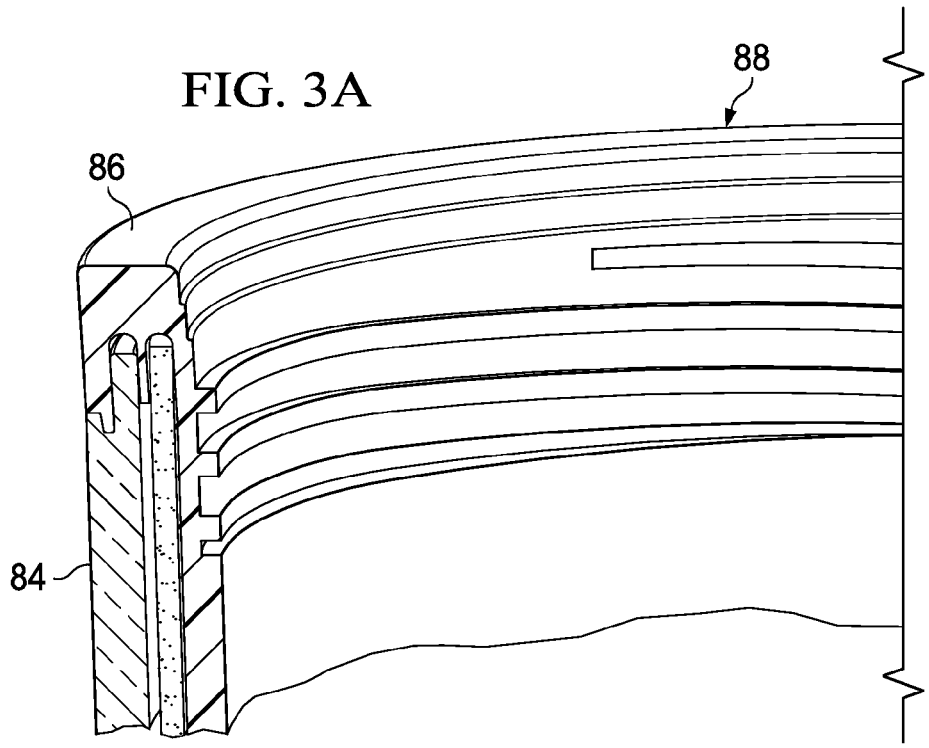

FIGS. 3A-C are simplified schematic diagrams showing various implementations of the vessel. In FIG. 3A, the vessel includes an outer wall 84, which is not translucent in this particular example. This outer opaque material may be a composite, which is smooth and which hides the inner wall of the vessel. In addition, FIG. 3A depicts a top ridge 88 of an inner wall, which includes several recesses 86 for receiving outer wall 84. FIG. 3B illustrates a cross-section of the vessel and depicts a set of threads 90 of the inner wall, which can receive a top that encloses the vessel.

FIG. 3C includes an outer wall 94 and a top 96. In this particular example, top 96 is threaded into the inner wall of the vessel. Additionally, the threading for top 96 is opposite to that of the underlying groove system (i.e., the ratcheting mechanism of the vessel, which secures the inner and outer walls). Stated in different manufacturing terminology, right-handed threads can be used in conjunction with a left-handed groove/ratcheting configuration or assembly, such that hand pressure only fosters this connection. This may be significant as an end user applies pressure in tightening top 96 (e.g., once the vessel is filled with a fluid). In one general sense, pressure applied by the end user would only increase the securing mechanism used to couple the inner and outer walls. Thus, over-tightening by a given end user (which is common) would not separate or dislodge the inner and outer walls. This is in contrast to welding assemblies in which torque provided by the end user can readily break the connection between the outer and inner walls.

Note that it should be appreciated that vessel 10 can take various forms and shapes. Furthermore, the illustrations provided here are only representing some of the many possible scenarios to which the securing features discussed in this Specification may be applied. For example, although represented as a tall, slender drinking vessel, any multi-walled vessel could benefit from the broad teachings of the present disclosure. The term "vessel" as used herein in this Specification is inclusive of any multi-walled vessel and such items may include cups, bowls, mugs, platters, thermoses, or any other element or object capable of utilizing the binding mechanisms outlined herein.

It is also important to note that the steps described with reference to the preceding FIGURES illustrate only some of the possible scenarios that may be used in conjunction with vessel 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by vessel 10 in that any suitable arrangements, chronologies, and configurations may be provided without departing from the teachings of the discussed concepts. Although the present disclosure has been described in detail with reference to particular embodiments, it should be understood that various other changes, substitutions, and alterations may be made hereto without departing from the spirit and scope of the present disclosure. The illustrated device and operations have only been offered for purposes of example and teaching. Suitable alternatives and substitutions are envisioned and contemplated by the present disclosure: such alternatives and substitutions being clearly within the broad scope of the proposed solutions. In addition, while the foregoing discussion has focused on fluid activities, any other suitable environment requiring the transportation or the storage of liquids, dry materials, food, etc. may benefit from the teachings provided herein. Any such applications are clearly within the scope of the tendered concepts.

What is claimed is:

1. An apparatus, comprising:
   a vessel that includes an inner wall and an outer wall, wherein the outer wall includes a first set of grooves configured on an interior portion of a bottom of the outer wall, and wherein the inner wall includes a second set of grooves configured on an exterior of the inner wall, and wherein the first set of grooves are configured to interface with the second set of grooves to secure the inner wall and the outer wall together, wherein the first set of grooves and the second set of grooves are provided as ascending steps such that a rotational force applied to one of the walls operates to engage subsequent steps in each of the first and second sets of grooves.

2. The apparatus of claim 1, further comprising:
   a lip configured on the inner wall, wherein the walls are configured such that a rotational force applied to one of the walls creates a force being applied to the lip to secure the inner wall and the outer wall together.

3. The apparatus of claim 2, wherein the lip includes two ridges that interface with the outer wall as the walls are secured together.

4. The apparatus of claim 1, wherein a space between the inner wall and the outer wall defines an insulating cavity for the vessel.

5. The apparatus of claim 1, further comprising:
   a recess configured on the interior portion of the bottom of the outer wall; and
   a protrusion configured on the exterior of the inner wall, wherein the recess interfaces with the protrusion as the inner wall and the outer wall are secured together.

6. The apparatus of claim 1, wherein the inner wall comprises propylene.

7. The apparatus of claim 6, wherein the inner wall is translucent such that indicia positioned between the inner and outer walls is visible from an exterior view of the vessel.

8. The apparatus of claim 1, further comprising:
   a top configured to enclose an open end of the vessel, wherein the top includes a first set of threads that are configured to interface with a second set of threads configured on the inner wall of the vessel.

9. The apparatus of claim 8, wherein the first set of threads is opposite an alignment between the first and second sets of grooves such that a rotational force being applied to tighten the top against the inner wall would increase a connection strength between the inner wall and the outer wall.

10. The apparatus of claim 1, wherein the outer wall comprises styrene.

11. The apparatus of claim 1, wherein the outer wall is opaque.

12. The apparatus of claim 1, further comprising:
    a first set of fins configured on the exterior of the inner wall; and
    a first set of ridges the interior portion of the bottom of the outer wall, wherein the fins interface with the ridges as the inner wall and the outer wall are secured together.

13. An apparatus, comprising:
    a vessel;
    an inner wall;
    an outer wall, wherein the outer wall includes a first set of grooves configured on an interior portion of a bottom of the outer wall, and wherein the inner wall includes a second set of grooves configured on an exterior of the inner wall, and wherein the first set of grooves are configured to interface with the second set of grooves to secure the inner wall and the outer wall together, and wherein the first set of grooves and the second set of grooves are provided as ascending steps such that a rotational force applied to one of the walls operates to engage subsequent steps in each of the first and second sets of grooves; and a lip configured on the inner wall, wherein the walls are configured such that a rotational force applied to one of the walls creates a force being applied to the lip to secure the inner wall and the outer wall together.

14. The apparatus of claim 13, wherein the lip includes two ridges that interface with the outer wall as the walls are secured together.

15. The apparatus of claim 13, wherein a space between the inner wall and the outer wall defines an insulating cavity for the vessel.

16. The apparatus of claim 13, further comprising:
a recess configured on the interior portion of the bottom of the outer wall; and
a protrusion configured on the exterior of the inner wall, wherein the recess interfaces with the protrusion as the inner wall and the outer wall are secured together.

17. The apparatus of claim 13, wherein the inner wall comprises propylene, and wherein the inner wall is translucent such that indicia positioned between the inner and outer walls is visible from an exterior view of the vessel.

18. The apparatus of claim 13, further comprising:
a top configured to enclose an open end of the vessel, wherein the top includes a first set of threads that are configured to interface with a second set of threads configured on the inner wall of the vessel, and wherein the first set of threads is opposite an alignment between the first and second sets of grooves such that a rotational force being applied to tighten the top against the inner wall would increase a connection strength between the inner wall and the outer wall.

19. The apparatus of claim 13, wherein the outer wall comprises styrene and wherein the outer wall is opaque.

* * * * *